Dec. 1, 1936.  E. G. BAUER ET AL  2,062,961
MICROMETER ATTACHMENT
Filed April 10, 1935
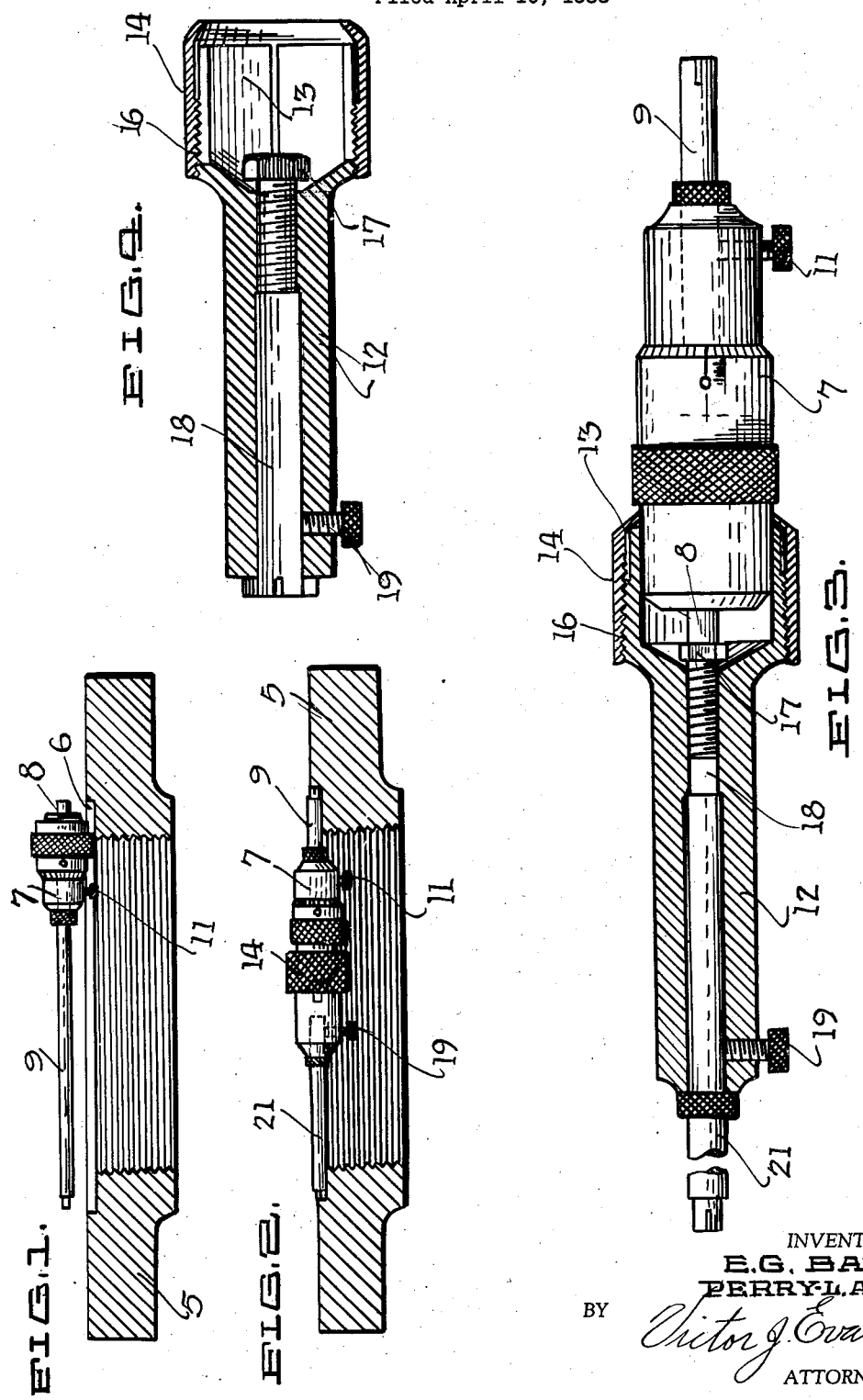
INVENTOR.
E.G. BAUER
PERRY L. ANGEL
BY
ATTORNEYS Patented Dec. 1, 1936

2,062,961

UNITED STATES PATENT OFFICE 2,062,961

MICROMETER ATTACHMENT

Edward G. Bauer and Perry L. Angel, Pomona, Calif.

Application April 10, 1935, Serial No. 15,654

1 Claim. (Cl. 33—167)

This invention relates to improvements in micrometer attachments and has particular reference to a device for employment with an ordinary micrometer whereby the effective range may be materially increased.

A further object is to produce a device of this character which will enable the measuring of relatively shallow counter-bores.

A further object is to produce a device which is economical to manufacture.

A still further object is to produce a device which may be quickly attached and detached and a device which is properly balanced for easy handling.

Other objects and advantages will be apparent during the course of the following description.

In the accompanying drawing forming a part of this specification and in which like numerals are employed to designate like parts throughout the same, Fig. 1 is a side elevation of an ordinary micrometer illustrating the fact that a counter-bore cannot be measured therewith, Fig. 2 is a similar view showing our device attached to the micrometer illustrating the device in use, Fig. 3 is an enlarged side elevation of a standard micrometer having our device attached thereto, the same being partly shown in cross section and Fig. 4 is an enlarged detail view of our device in cross section.

Inside micrometers usually consist of a relatively large micrometer barrel with a short stub sticking out of one end and a long stub sticking out of the other end. The result of this construction is that the barrel will engage the work to be measured, and consequently a relatively shallow counter-bore cannot be measured. Our device consists of an extension which is placed upon the micrometer and extends from one end thereof. This extension is capable of receiving rods of various lengths, which together with the customary rods carried in the opposite end of the micrometer, provides a device capable of measuring shallow counter-bores accurately and in an easy and expeditious manner.

In the accompanying drawing wherein for the purpose of illustration is shown a preferred embodiment of our invention, the numeral 5 designates any piece of work such as a pipe flange having a relatively shallow counter-bore 6. At 7 we have designated an ordinary micrometer of the Starrett type, which is equipped with a short stub 8 and a long stub 9, the long stub being removable so that stubs of various lengths may be inserted and held in place by a set screw 11.

Our invention consists of a tubular member 12 having an enlarged contractible head 13. This head is contracted through the employment of a compression ring 14 which is threaded as at 16 to the head. A gauge member in the form of a screw bolt 17 is threadedly secured into one end of the bore 18 of the tubular member 12, and has its head arranged within the head 13. A set screw 19 extends through the tubular member and into the bore adjacent its opposite end. A gauge rod 21 is held in the bore 18 by the screw 19. In use the micrometer 7 is placed in the head 13 so that the stub 8 abuts the head of the screw bolt 17, after which the compression ring 14 is tightened so that the contractible head will engage and hold the micrometer firmly therein. Gauge rods 9 and 21 are then inserted in the micrometer and tubular member, respectively, and secured. As these gauge rods, plus the length of the micrometer and the tubular member, are known, the zero setting will represent this known length. For instance, when all the parts are properly assembled, the device may measure four inches. Therefore, any expansion of micrometer would result in a reading of four inches plus the expansion.

It will thus be seen that we have produced a device which will greatly improve the range of usefulness of the micrometer, without materially adding to its cost.

It is to be understood that the form of our invention herewith shown and described is to be taken as a preferred example of the same and that various changes relative to the material, size, shape and arrangement of parts may be resorted to without departing from the spirit of the invention or the scope of the subjoined claim.

Having thus described our invention, we claim:—

An attachment for an inside micrometer, comprising a tubular member, a contractible head on one end of the tubular member to receive the stub end of the micrometer therein, a compression ring threaded on the head for detachably securing the micrometer thereto, a headed bolt threaded in the headed end of the tubular member with the head of the bolt disposed in the path of the stub of the micrometer to contact the same, and a measuring rod detachably and adjustably mounted in the opposite end of the tubular member to extend therefrom for cooperation with the measuring rod of the micrometer to contact the work to be measured.

EDWARD G. BAUER.
PERRY L. ANGEL.